United States Patent Office 3,005,839
Patented Oct. 24, 1961

3,005,839
PROCESS FOR THE PURIFICATION OF
CIS-16,17-DIHYDROXY STEROIDS
Lewis Joseph Leeson, Park Ridge, Siegfried Arthur Muller, Closter, and George Madison Sieger, East Paterson, N.J., assignors to American Cyanamid Company, New York, N.Y., a corporation of Maine
No Drawing. Filed Jan. 21, 1959, Ser. No. 788,037
12 Claims. (Cl. 260—397.45)

This invention relates to a process of purifying steroids. More particularly, it relates to a method of purifying 16α,17α-dihydroxy steroids of the pregnane series, esters and intermediates thereof.

Recently steroids of the pregnane series having 16α,17α-dihydroxy groups present have been shown to have high glucocorticoid activity with natriuresis. The product triamcinolone described in U.S. Patent No. 2,789,118 is a steroid of this type. A process for the preparation of 16α,17α-dihydroxy steroids of the pregnane series free from other closely related steroids is desirable.

It is an object of this invention to effect the selective separation of cis-16,17-dihydroxy steroids from mixtures containing these dihydroxy groups and other steroids as well as further impurities.

It is a further object of this invention to selectively isolate cis-16,17-dihydroxy steroids from fermentation media, crude filter cakes, and so forth, where related steroids might be advantageously separated or isolated.

A still further object of this invention is to effect a purification or upgrading of a particular crude cis-16,17-dihydroxy steroid.

Previously the standard operating method to separate, for example, 9α-fluoro-11β,16α,17α,21-tetrahydroxy - 4 - pregnene - 3,20 - dione from, for example, 9α - fluoro-11β,17α,21-trihydroxy-4-pregnene-3,20-dione involved the use of an organic solvent such as methylisobutylketone. After concentration of the extract by heating under reduced pressure, the resulting product often contained a considerable amount of the non-cis, 16α,17α-dihydroxy steroid and necessitated the used of complicated separation and recrystallization procedures in order to obtain a pure compound. Such procedures as the concentrating of the methylisobutylketone extract and the separating and recrystallizing of the impure product were time consuming and expensive and invariably resulted in lower product yields.

We have now found that the present invention can be carried out starting with an aqueous solution containing a mixture of steroids which is treated with boric acid and an alkali metal carbonate. The amount of boric acid and carbonate depends largely upon the quantity of the cis-16,17-dihydroxy steroid contained in the solution. Alternatively, other metals or amine carbonates or hydroxides or amines can be used in place of sodium carbonate. Also alkali metal or amine borates can be used directly. The reaction is preferably carried out at a pH of about 9.0. The mixture is agitated and the insoluble material (unreacted steroids and impurities) is filtered off. The clear filtrate is acidified, producing the regenerated free cis-16,17-dihydroxy steroid as an insoluble precipitate. The separation of the mixtures of steroids containing cis-16,17-dihydroxy groups can be accomplished by chromatographic separation as shown hereinafter in the examples.

The process of the present invention can also be carried out in the following manner: An organic solvent such as methylisobutylketone can be used to extract the desired steroids from the harvest mash. A borate ester salt can be formed at this stage or after concentration of the methylisobutylketone. In either case, the addition of an aqueous solution of borate salt results in the formation of a cycloborate ester of those steroids containing adjacent hydroxyl groups. Such borate esters are soluble in the aqueous borate solution and all other steroids are substantially insoluble in this solution and may be removed by simple filtration. After acidification to below pH 2, subsequent transesterification with methanol permits the formation of methyl borate which forms a minimum boiling azeotrope with methanol and is easily removed by distillation, leaving the desired cis-dihydroxy steroid in pure form.

Among the suitable starting steroids utilizable in the process of the present invention are those containing adjacent cis-hydroxyl groups in the 16α,17α-positions, any mixture of steroids or impure steroid crystals containing compounds having adjacent cis-hydroxyl groups in the 16α,17α-positions, and steroids capable of being hydrolyzed to compounds containing adjacent cis-hydroxy groups in the 16α- and 17α-positions, these latter including steroid acetates capable of being deacetylated to form compounds having adjacent cis-hydroxyl groups in the 16α-17α-positions, steroid monoacetates capable of being deacetylated and hydrolyzed to compounds containing adjacent cis-hydroxyl groups in the 16α,17α-positions, steroid acetonides capable of being altered to form compounds containing adjacent cis-hydroxyl groups in the 16α,17α-positions.

The new process of the present invention also affords a process of preparing 21-monoesters wherein a reaction mixture containing 21-monoester and 16α,21-diester is treated with sodium borate solution. The 21-monoester selectively reacts to form the 16α,17α-sodium borate, dissolving in the sodium borate solution, whereas the 16α,21-diester does not react with the sodium borate, and remains undissolved. Filtration then enables separation of the undissolved 16α,21-diester from the 16α,17α-sodium borate, from which the 16α,17α-dihydroxy steroid can be regenerated by acidification. The process also permits the preparation of mixed esters wherein after regeneration of the 16α,17α-dihydroxy steroid, the 16α-hydroxy group is then esterfied by an acid or anhydride producing an ester different from that in the 21-position as shown hereinafter in the examples.

EXAMPLE 1

To a small glass vessel is added 0.3963 gram of 9α-fluoro-16α-hydroxy prednisolone, 0.0667 gram of boric acid and 5 ml. of water. To this suspension is added 0.55 ml. of 10% sodium carbonate solution. The suspension is allowed to stand for three days with occasional shaking. At the end of this time, solution is almost complete, and the preparation filtered clear. Dilute hydrochloric acid is added dropwise until the pH of the solution is below two. A precipitate (B) forms and is filtered off, washed and dried under reduced pressure at 45°. When compared to the starting material (A), the results shown as chemical assay are obtained. The sample is found to have a loss on drying of 2.88%. This brings the ultraviolet assay up to 100%, and the blue tetrazolium value to 90%. The sample is also found to contain 0.15% chlorine.

Chemical Assay

| Sample | Melting point, degrees | Ultraviolet, percent | Blue Tetrazolium, percent | Results of I.R. Analysis |
|---|---|---|---|---|
| (B) | 236–238 | 98.4 | 87.5 | 9α-fluoro-16α-hydroxy-prednisolone. |
| (A) | 252–254 | 99.96 | 97.89 | Do. |

Sample (B) weighs 0.3440 gram which is equal to 0.3341 gram when corrected for loss on drying. This is a yield of approximately 85%.

EXAMPLE 2

A sample of 0.487 gram of the sodium borate salt of 9α-fluoro-16α-hydroxy-hydrocortisone is dissolved in 25 ml. of water. Dilute hydrochloric acid is added until the pH is below two. The precipitate which forms is filtered off, washed and dried. The infrared analysis indicates the material to be 9α-fluoro-16α-hydroxy-hydrocortisone while the blue tetrazolium analysis shows the material to be 96.0% pure.

EXAMPLE 3

To 5 ml. of approximately 3% boric acid is added 3.8 ml. of approximately 9% sodium carbonate solution. To this solution is added 0.3 gram of hydrocortisone, 40 ml. of water and the mixture allowed to stand for forty-eight hours. The material is filtered, and the filtrate is sent for an analysis to determine the hydrocortisone concentration. The ultraviolet analysis shows no significant results, while the blue tetrazolium test demonstrates 33 mcg./ml. This is in the range of the normal solubility of hydrocortisone and indicates that no sodium borate salt of hydrocortisone is formed.

EXAMPLE 4

The following mixture of steroids is prepared:

|  | (A) | (B) | (C) | (D) |
|---|---|---|---|---|
|  | G. | G. | G. | G. |
| 9α-fluoro-16α-hydroxyprednisolone | 0.7168 |  | 0.0562 | 0.1477 |
| 9α-fluoro-16α-hydroxyhydrocortisone |  | 0.5143 |  |  |
| Hydrocortisone | 0.4633 | 0.2328 |  |  |
| Prednisone |  |  | 0.0695 |  |
| Prednisolone |  |  |  | 0.0812 |

To both (A) and (B) is added 5 ml. of 3% boric acid solution and 3.8 ml. of 9% sodium carbonate.

To both (C) and (D) is added 1 ml. of 3% boric acid solution and 0.76 ml. of 9% sodium carbonate solution.

The mixtures are allowed to stand 48 hours with occasional mixing. At the end of this time, the undissolved material of each mixture is filtered off, washed and dried and weighed. The filtrates are each mixed with dilute hydrochloric acid until the pH is approximately two. The precipitates which result are filtered off, washed, dried and weighed. The results obtained from the weights and analyses of materials are shown on the following table.

| Sample | Percent Yield of Undissolved Material | Percent Yield of Acid Precipitated Filtrate | Analyses of Precipitated Steroids in Filtrate | | |
|---|---|---|---|---|---|
| | | | I.R. Results | B.T. Analysis, Percent | U.V. Analysis, Percent |
| A | 95.9 | 89.0 | 9α-fluoro-16α-hydroxy-prednisolone. | 92.0 | 98.7 |
| B | 82.0 | 61.7 | 9α-fluoro-16α-hydroxy-hydrocortisone. | 95.6 | 91.3 |
| C | 87.8 | 30.6 | 9α-fluoro-16α-hydroxy-prednisolone. | 95.2 | 95.5 |
| D | 71.3 | 74.2 | ____do____ | 95.8 | 95.4 |

These results indicate an excellent method of separating cis diols from noncis diols with a steroid nucleus.

EXAMPLE 5

A series of columns is set up for partition chromatography using diatomaceous earth as the support and a system of ethyl acetate/water. In each column 22 ml. of equilibrated aqueous phase is used to dissolve the sample. The "charge," a steroid borate, is admixed with 28 g. of diatomaceous earth and packed on top of the development portion which is 67 ml. aqueous phase admixed with 84 g. of diatomaceous earth. Each column is developed in excess of five holdback volumes. In each case, steroid (based upon a blue tetrazolium spot test) comes off at the solvent front. Tailing is extensive. The first portion, approximately 1/10 holdback volume, is discarded due to presence of the colored impurity. The blue tetrazolium positive fractions are combined, allowed to evaporate, and the well defined crystalline 9α-fluoro-16α-hydroxy-hydrocortisone or 9α-fluoro-16α-hydroxy-prednisolone products are obtained. These steroids are regenerated from the ammonium and sodium borate derivatives of each. All products are insoluble in water in contrast to the borate salt starting material.

EXAMPLE 6

Using a 16α-hydroxylating strain of Streptomyces roseochromogenus such as ATCC No. 3347 as a fermentative microorganism, a fermentation medium consisting of Soybean meal 20 g., glucose 35 g., calcium carbonate 2.5 g., soybean oil 2.5 ml., and water to make 1000 ml., a substrate consisting of about 250 to 400 mcg. ml. fermentation concentration of 9α-fluoro-11β,17α,21-trihydroxy-4-pregnene-3,20-dione (F–2), 9α-fluorohydrocortisone (FF) and a conversion time of 60 to 90 hours; there is produced a harvest mash containing 9α-fluoro-11β,16α,17α,21-tetrahydroxy-4-pregnene-3,20-dione (F–3) 16α-hydroxy-9α-fluorohydrocortisone (FF16). The harvest mash is extracted with methylisobutylketone (MIBK) and assayed 239 mcg./ml. of F-3 (Blue Tetrazolium method) and 307 mcg./ml. (Polarographic method). Five serial extractions of 2.0 liters of the MIBK extract of the 9α-fluoro-11β,16α,17α,21-tetrahydroxy-4-pregnene-3,20-dione harvest mash are performed using 20 ml. aliquots of a 0.10 M (4% w./v.) aqueous solution of sodium tetraborate ($Na_2B_4O_7 \cdot 10H_2O$). These aliquots are combined and filtered. The pH of the filtered solution is adjusted to 1.5–2.0 with 2 ml. of concentrated hydrochloric acid. After standing at room temperature overnight, the solution is filtered and the crystals thus obtained are rinsed and dried under reduced pressure. The yield is 464 mg. of 9α-fluoro-11β,16α,17,21-tetrahydroxy-4-pregnene-3,20-dione cycloborate. Transesterification of 400 mg. of this impure cycloborate is accomplished by adding 25 ml. aliquots of methanol to it five different times, evaporating the 25 ml. of solution almost to dryness each time before adding the next 25 ml. aliquot of methanol. The methyl borate formed by the transesterification process is thus formed and removed, leaving 373 mg. of 9α-fluoro-11β,16α,17α,21-tetrahydroxy-4-pregnene-3,20-dione (theoretical recovery 376 mg.). The material assays 982 mcg./mg. (BT-Spectrophotometric) and 1012 mcg./mg. (Polarographic).

EXAMPLE 7

A 10:90 crystal mixture of 9α-fluoro-11β,17α,21-trihydroxy-4-pregnene-3,20-dione and 9α-fluoro-11β,16α,17α,21-tetrahydroxy-4-pregnene-3,20-dione is slurried in an 0.10 M (4% w./v.) aqueous solution of sodium tetraborate at room temperature at the pH which is normal for borate (9.0–9.2) for ½-hour. At the termination of that period, the slurry is filtered to remove insoluble materials 9α-fluoro-11β,17α,21α-trihydroxy-4-pregnene-3,20-dione. The filtrate, consisting of 9α-fluoro-11β,16α,17α,21-tetrahydroxy-4-pregnene-3,20-dione cycloborate, is adjusted to pH 1.5–2.0 with concentrated hydrochloric acid and chilled to about 0° C. to promote crystallization. The crystals which formed are separated by filtration and rinsed with a small amount of water. These 9α-fluoro-11β,16α,17α,21-tetrahydroxy-4-pregnene-3,20-dione cycloborate crystals (600 mg.) are converted to the desired 9α-fluoro-11β,16α,17α,21-tetrahydroxy-4-pregnene-3,20-dione by transesterification with methanol as outlined in Example 6.

EXAMPLE 8

Using *Bacterium cyclooxidans* ATCC No. 12,673, the fermentation medium

|  | Grams |
|---|---|
| Glucose | 20.0 |
| Peptone | 5.0 |
| Tryptone | 5.0 |
| Yeast extract | 5.0 |
| $CaCO_3$ | 2.5 |

Distilled water q.s. 1000 ml.

and a 56 mg. substrate of 9α-fluoro-11β,16α,17α,21-tetrahydroxy-4-pregnene-3,20-dione and a 24 hour conversion at a pH of about 6.0, there is obtained 9α-fluoro-11β,16α,17α,21-tetrahydroxy-1,4-pregnadiene-3,20-dione harvest mash. A 275 ml. portion of the above harvest mash is extracted three times with 140 ml. of methylisobutylketone each time. The pooled 420 ml. of methylisobutylketone is then back-extracted five times with 4 ml. of 0.10 M (4% w./v.) aqueous solution of $Na_2B_4O_7 \cdot 10H_2O$ each time. The total 20 ml. of sodium borate back-extract solution is adjusted to pH=1.6 with 0.4 ml. of concentrated hydrochloric acid. No precipitation or crystallization occurs. Next, a total of 5 ml. of saturated ammonium sulfate $(NH_4)_2SO_4$ solution is also added in 5 steps of 1 ml. each to the acidified back-extract solution, followed by a single addition of 5 ml. of saturated sodium chloride solution. After ½-hour in a chill room some crystallization is visible at the interface of the small amount of methylisobutylketone phase present.

The total 35 ml. of liquid is then extracted three times with 17 ml. of methylisobutylketone being employed each time. This extract is evaporated in a hood draft to yield 24 mg. of a product which has the same $R_f$ value as 9α-fluoro-11β,16α,17α,21-tetrahydroxy-1,4-pregnadiene-3,20-dione on a paper chromatogram.

EXAMPLE 9

One gram of triamcinolone is added to 10 ml. of 0.12 N aqueous sodium tetraborate solution. This suspension is allowed to stand 24 to 48 hours with mixing. At the end of this time it is filtered free of a small amount of remaining insoluble material and the clear filtrate lyophilized. The borate salt is obtained snow white and crystalline.

EXAMPLE 10

One gram of 9α-fluoro-11β,16α,17α,21-tetrahydroxy-4-pregnene-3,20-dione is added to 10 ml. of 0.12 N aqueous sodium tetraborate solution. This suspension is allowed to stand 24 to 48 hours with mixing. At the end of this time, it is filtered free of the small amount of remaining insoluble material and clear filtrate lyophilized. The borate salt is a white crystalline solid.

EXAMPLE 11

One gram of 11β,16α,17α,21-tetrahydroxy-4-pregnene-3,20-dione is added to 10 ml. of 0.12 N aqueous sodium tetraborate solution. This suspension is allowed to stand 24 to 48 hours with mixing. At the end of this time it is filtered free of the small amount of remaining insoluble material and clear filtrate lyophilized. The borate salt is a white crystalline solid.

EXAMPLE 12

One gram of triamcinolone is added to 4 ml. of pyridine and 0.25 ml. of acetic anhydride is introduced. The solution is allowed to stand for 4 to 5 hours at room temperature and poured into 40 ml. of cold dilute sulfuric acid. The precipitate which forms is removed, washed, dried and added to 25 ml. of 0.1 N sodium tetraborate solution. After standing overnight with occasional mixing the insoluble material is filtered off, and dilute hydrochloric acid added to the filtrate until the pH is below two. The observed precipitate is filtered, washed with boiling water and dried. Infrared analysis of the product obtained by the above procedure indicated it to be triamcinolone 21-monoacetate.

EXAMPLE 13

Following the procedure of Example 12 and substituting for triamcinolone the steroid 9α-fluoro-16α-hydroxyhydrocortisone, a pure 21-acetoxy-9α-fluoro-11β,16α,17α-trihydroxy-4-pregnene-3,20-dione is obtained.

EXAMPLE 14

One gram of 9α-fluoro-16α-hydroxyhydrocortisone is dissolved in 6 ml. of pyridine and 0.4 ml. of butyric anhydride added. The mixture is allowed to stand overnight at room temperature. The solution is poured into 25 ml. of cold dilute sulfuric acid and the observed precipitate removed and washed. It is added to 25 ml. of 0.1 N sodium tetraborate solution and permitted to stand overnight with occasional shaking. The insoluble material is filtered and to the filtrate is added dilute hydrochloric acid until the pH is below two. The observed precipitate is filtered, washed with boiling water and dried. Infrared analysis of the product obtained by the above procedure indicated it to be pure 21-butyroxy-9α-fluoro-11β,16α,17α-trihydroxy-4-pregnene-3,20-dione.

EXAMPLE 15

One gram of 9α-fluoro-16α-hydroxyhydrocortisone is dissolved in 8 ml. of pyridine and 0.55 grams of benzoic anhydride added. The solution was allowed to stand overnight and then poured into 35 ml. of cold dilute sulfuric acid. The precipitate is filtered, washed and added to 25 ml. of 0.1 N sodium tetraborate solution. The mixture is allowed to stand overnight, the insoluble material removed and the filtrate acidified with HCl until the pH is below two. The observed precipitate is filtered, washed with boiling water and dried. Infrared analysis of the product obtained employing the above procedure indicated it to be pure 21-benzoxy-9α-fluoro-11β,16α,17α-trihydroxy-4-pregnene-3,20-dione.

EXAMPLE 16

Two hundred mg. of triamcinolone 21-monoacetate is dissolved in 2½ ml. of pyridine and 0.2 ml. of n-butyric anhydride added. Solution is effected by a small amount of heat. The mixture is poured into 25 ml. of dilute hydrochloric acid and the observed precipitate filtered, washed and dried. Recrystallization from chloroform-petroleum-ether produces a pure product, 16-butyroxy-21-acetoxy-9α-fluoro-11β,17α-dihydroxy-1,4-pregnadiene-3,20-dione.

We claim:
1. A process for the separation and purification of 9α-fluoro-16α-hydroxyprednisolone which comprises adding said compound to a solution containing boric acid and an alkali metal carbonate, filtering off any solids, acidifying to a pH below about two, removing the precipitate and recovering the purified product therefrom.

2. In a process for the separation and purification of 9α-fluoro-16α-hydroxyprednisolone the step which comprises acidifying with a mineral acid an alkali metal borate salt of 9α-fluoro-16α-hydroxyprednisolone to a pH less than two, separating the precipitate formed and recovering the purified product therefrom.

3. A process for the separation and purification of 9α-fluoro-16α-hydroxyprednisolone which comprises extracting the harvest mash resulting from the fermentation of 9α-fluoro-11β,17α,21-trihydroxy-4-pregnene-3,20-dione and *Streptomyces roseochromogenus* with methylisobutylketone, adding sodium tetraborate to form the corresponding 16,17-cycloborate ester filtering to remove any insoluble precipitate, acidifying to pH below 2 treating said ester with methanol, azeotropically distilling off the methyl borate formed and recovering said 9α-fluoro-16α-hydroxyprednisolone therefrom.

4. A process for the separation and purification of 9α-fluoro-16α-hydroxyprednisolone which comprises dissolving said compound in an aqueous solution of sodium tetraborate, filtering to remove any insoluble precipitate, acidifying to a pH below 2 adding methanol, azeotropically distilling off methyl borate and recovering said 9α-fluoro-16α-hydroxy-prednisolone therefrom.

5. A process for the separation and purification of 9α-fluoro-16α-hydroxy-prednisolone-21-acetate which comprises reacting 9α-fluoro-16α-hydroxy-prednisolone with acetic anhydride precipitating the reaction product by the addition of a mineral acid, dissolving the said precipitate in aqueous alkali metal tetraborate solution, filtering off impurities, adding a mineral acid to a pH of less than two and recovering the said product in pure form.

6. A process for the separation and purification of 9α-fluoro-16α-butyroxy-21-acetoxy-prednisolone which comprises reacting 9α-fluoro-16α-hydroxy-prednisolone with an equivalent of an acetylating agent, precipitating the reaction product by the addition of a mineral acid, dissolving the said precipitate in aqueous alkali metal tetraborate solution, filtering off impurities, precipitating the reaction product by the addition of a mineral acid to a pH less than two, reacting the product with butyric anhydride and recovering said product therefrom.

7. A process for the purification of 11β,16α,17α,21-tetrahydroxy-4-pregnene-3,20-dione which comprises treating said 4-pregnene with an aqueous alkali metal borate solution to form a steroid alkali metal borate ester, separating the latter borate ester in solution, acidifying said solution to a pH less than 2 and recovering said purified compound.

8. A process for the purification of an 11β-hydroxy-cis-16α,17α-dihydroxy Δ⁴-3,20-diketo steroid of the pregnane series which comprises mixing said steroid with an aqueous alkaline borate solution to form the steroid borate salt, separating the said borate salt in solution, acidifying the said borate salt solution to a pH less than 2 and recovering the said cis 16α,17α-dihydroxy steroid therefrom.

9. A process for the purification of an 11β-hydroxy cis-16α,17α-dihydroxy Δ⁴-3,20-diketo steroid of the pregnane series which comprises mixing said steroid with an alkali metal borate to form a water-soluble steroid cycloborate, separating the said cycloborate, adding a mineral acid to produce a pH less than 2 and recovering the precipitated cis-16α,17α-dihydroxy steroid therefrom.

10. A process for the purification of an 11β-hydroxy cis-16α,17α-dihydroxy Δ⁴-3,20-diketo steroid of the pregnane series which comprises mixing said steroid with an aqueous alkaline borate solution to form a water-soluble steroid borate salt, separating the said borate salt in solution, acidifying to a pH less than 2, separating the resulting precipitate, dissolving the said precipitate in a lower alkyl alcohol, removing the lower alkyl alcohol borate formed and recovering the purified steroid therefrom.

11. The compound having the formula:

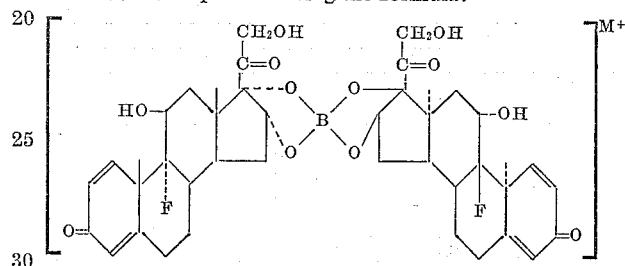

in which M is an alkali metal ion.

12. A process for preparing the compound:

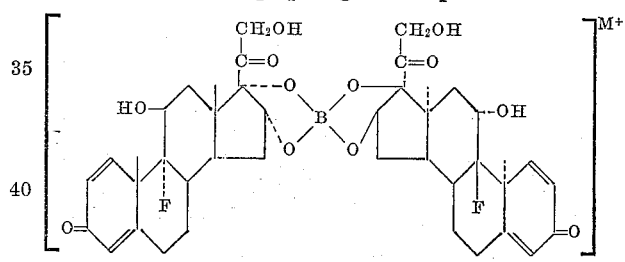

in which M is an alkali metal ion, which comprises treating 9α-fluoro-16α-hydroxy prednisolone with an aqueous alkali metal borate solution and separating said product therefrom.

References Cited in the file of this patent

UNITED STATES PATENTS 2,831,003    Thomas  ---------------- Apr. 15, 1958